H. M. CRAWFORD.
DENTAL INSTRUMENT.
APPLICATION FILED SEPT. 28, 1914.
1,138,631.
Patented May 11, 1915.
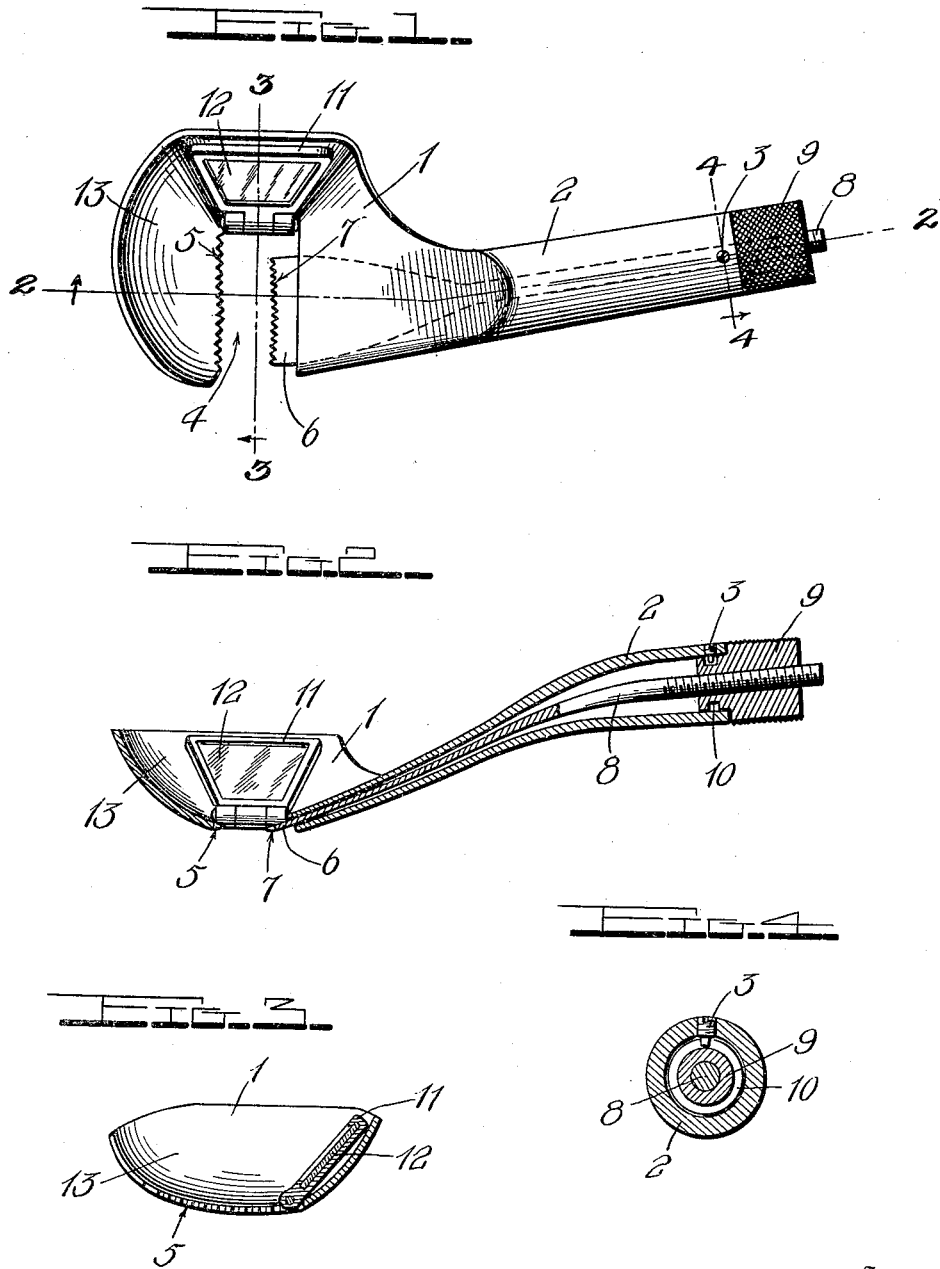
Witnesses
Chas. L. Griesbauer
H. Woodard
Inventor
H. M. Crawford,
By H. B. Willson & Co.
Attorneys

UNITED STATES PATENT OFFICE.

HARRY M. CRAWFORD, OF LIMA, OHIO.

DENTAL INSTRUMENT.

1,138,631.  Specification of Letters Patent.  Patented May 11, 1915.

Application filed September 28, 1914. Serial No. 863,948.

*To all whom it may concern:*

Be it known that I, HARRY M. CRAWFORD, a citizen of the United States, residing at Lima, in the county of Allen and State of Ohio, have invented certain new and useful Improvements in Dental Instruments; and I do declare the following to be a full, clear, and exact description of the invention, such as will enable others skilled in the art to which it appertains to make and use the same.

This invention relates to dental appliances and is designed particularly for operations upon the teeth of the lower jaw.

The object of the invention is to provide a simple and efficient instrument which when applied will clamp one or more teeth and be securely retained thereby in position to depress the tongue and retract the cheek in order to keep the tooth being operated upon dry and to protect the cheek and tongue from being brought into contact with the instrument and combining in a single tool a mouth mirror, tooth clamp, cotton holder, and tongue depressor, the tooth clamp being adjustable to fit teeth of different sizes.

To accomplish this object and others subordinate thereto, the invention in its preferred embodiment comprehends a substantially spoon-shaped tool having a recess extending transversely from one side thereof with a mirror hingedly mounted at the end of said recess and which is provided with a regulating or adjusting device for causing one of the members of the clamp to approach the other and clamp against the opposite sides of the teeth or to recede for the purpose of permitting the removal of the device from the mouth.

With this and other objects in view, the invention consists of certain novel features of construction, and the combination and arrangement of parts as will be more fully described and claimed.

In the accompanying drawings, Figure 1 represents a plan view of this improved instrument; Fig. 2 is a longitudinal section thereof, taken on the line 2—2 of Fig. 1; Fig. 3 is a transverse section taken on the line 3—3 of Fig. 1; Fig. 4 is a similar view taken on the line 4—4 of Fig. 1.

In the embodiment illustrated, a substantially spoon-shaped or concavo-convex member 1 is shown constructed of any suitable material, preferably thin metal which has a hollow handle 2 extending from one end thereof, said handle being here shown provided at its free end with an inwardly projecting stud as 3 for a purpose to be described. The bowl of this spoon-shaped member has a recess 4 extending transversely from one edge thereof and the outer wall of which is toothed or otherwise roughened, as shown at 5, to adapt it to firmly grip one side of the teeth with which the instrument is designed to be engaged when in operative position and which forms the stationary member of the tooth clamp. A movable clamp 6 is shown disposed at the opposite side of this recess 4 and is adjustable toward and away from the fixed clamping member 5 and its free or clamping edge thereof is also toothed or roughened as shown at 7 to facilitate its gripping action on the teeth. This adjustable clamp member 6 is made in the form of a plate having a rod 8 projecting from its rear end and which is designed to be housed within the tubular handle portion 2 of the instrument. This rod 8 has its outer end threaded and on this threaded end is mounted a clamp adjusting member 9 having a threaded bore for engagement with the threads on the rod 8. This adjusting member 9 is provided at its inner end on its outer face with an annular groove 10 with which the stud 3 is designed to engage and form a swivel connection between said adjusting member 9 and the tubular handle 2 to provide for the turning of said member 9 in said handle whereby the rod 8 carrying the movable clamp 6 is projected or retracted as may be desired.

A mirror 11 here shown substantially triangular in configuration is hingedly mounted at the inner end of the recess 4 and the reflecting surface 12 thereof is positioned on the inner face of said mirror to adapt it to reflect the teeth in connection with which the instrument is used in the manner of an ordinary mouth mirror. The hinged connection of this mirror is preferably made sufficiently stiff to adapt the mirror to remain in any position in which it may be placed, the purpose of which will be obvious. The tubular handle 2 is also in the form of an ordinary spoon handle being offset from the bowl thereof and renders the device easily controlled. The rounded front portion 13 of the bowl of the instrument is designed to rest on the tongue of the patient and hold it in depressed position, the curvature thereof rendering it as comfortable as possible for the patient.

It will be understood that these instruments are to be made in pairs to adapt them for use in the opposite sides of the mouth of the patient.

In the use of this instrument, the movable clamp 6 is first withdrawn by turning the member 9 in the proper direction to provide sufficient space between the clamping members to permit the insertion of the teeth between them and after it has been properly positioned on the teeth, this member 9 is turned in the opposite direction to project the clamp 6 and reliably grip the teeth between it and the stationary member 5. When in this position the absorbent cotton or other material, which is usually placed between the cheek and the gums of the patient, is held down in position by the rear portion of the bowl adjacent its connection with the handle 2 which serves primarily as a cheek retractor and when the instrument is so placed, and the rounded portion 13 bears on and holds the tongue depressed and operations may be performed on the teeth clamped by it and which will be clearly seen in the mirror disposed at the end of the recess 4.

To remove the instrument, it is obvious that the member 9 will be turned to withdraw the movable clamp 6 from engagement with the teeth and the tool may thus be readily removed.

The tubular handle 2 opens at its inner end directly opposite the stationary clamping jaw 5, as is shown clearly in Fig. 2, to provide for the positioning of the movable clamp in a plane in alinement with said stationary clamp.

I claim as my invention:

1. A dental instrument comprising a concavo-convex member having an opening extending transversely inward from one side thereof, and a movable member operable across said opening and adapted to coöperate with one wall of said opening to form a clamp.

2. A dental instrument comprising a concavo-convex member having an opening extending transversely thereof from one side inwardly, a mirror hinged at the end of said opening and a clamping member adjustable toward and away from one wall of said opening.

3. A dental instrument comprising a spoon-shaped member having a hollow handle, the bowl of said member having an opening extending inwardly from one side edge thereof, the outer wall of said opening being serrated to form a stationary clamping member, and a movable clamping member operable across said opening.

4. A dental instrument comprising a spoon-shaped member having a hollow handle, the bowl of said member having an opening extending inwardly from one side edge thereof, the outer wall of said opening being serrated to form a stationary clamping member, a movable clamping member mounted in said hollow handle, and means carried by said handle for projecting and withdrawing said member toward and away from said stationary clamping member.

5. A dental instrument comprising a spoon-shaped member having a hollow handle, the bowl of said member having an opening extending inwardly from one side edge thereof, the outer wall of said opening being serrated to form a stationary clamping member, a movable clamping member mounted in said hollow handle, and a rotatable member swiveled in said hollow handle and coacting with said movable clamping member to project and retract said member toward and away from the stationary clamping member.

6. A dental instrument comprising a spoon-shaped member having an opening extending transversely thereof, a mirror hinged at the inner end of said opening, and a member movable longitudinally of said member for projection toward and away from the outer wall of said opening.

7. In a dental instrument, the combination of a tooth clamp, and a mouth mirror hingedly connected to the clamp proper and adapted to be inserted with the clamp in the mouth of the patient.

8. A dental instrument comprising a spoon-shaped member having a hollow handle, a stud projecting into said handle at the outer end thereof, a nut rotatably mounted in said handle at its outer end and having an annular groove for the reception of said stud to provide a swiveled connection with the handle, the bowl of said spoon-shaped member being provided with a transversely extending stationary clamping member, and a movable clamping member for coöperation with said stationary member mounted in said tubular member and engaged with said nut, said movable member having a threaded connection with the nut to provide for its projection and retraction.

In testimony whereof I have hereunto set my hand in presence of two subscribing witnesses.

HARRY M. CRAWFORD.

Witnesses:
  D. S. MILLER,
  M. FUNK.